UNITED STATES PATENT OFFICE.

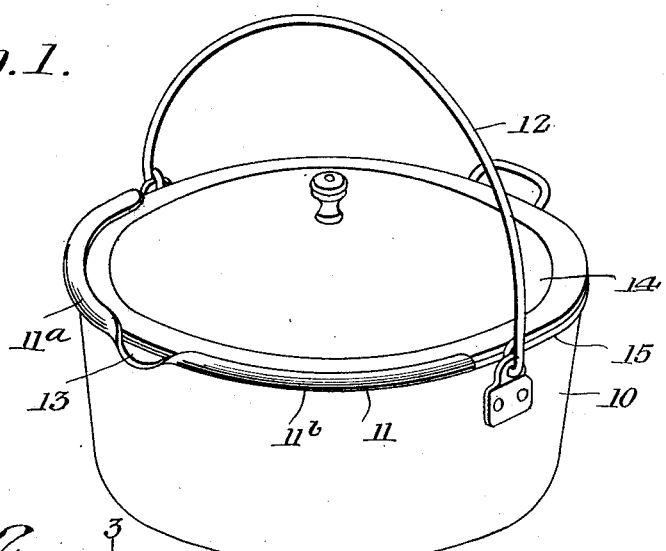
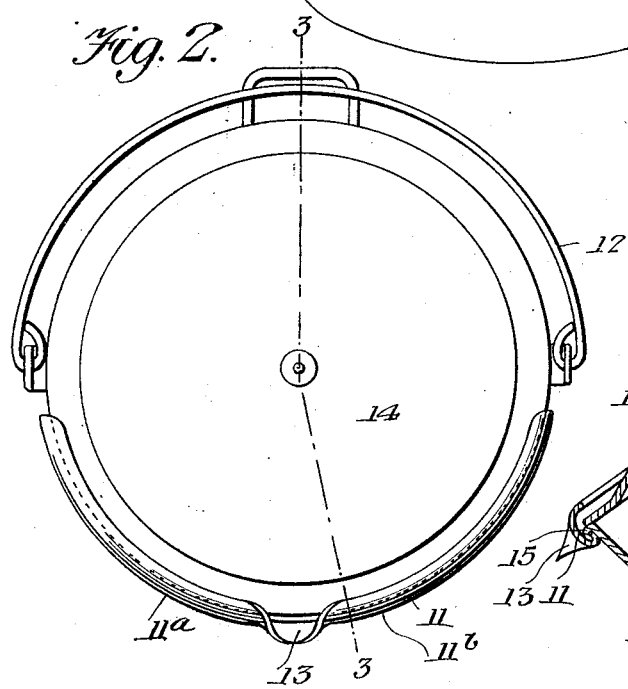
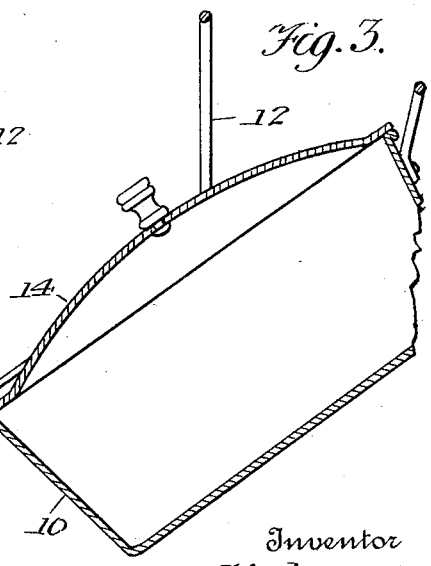

EARL P. SIDLE, OF KANSAS CITY, MISSOURI.

KETTLE-LID HOLDER.

1,408,410.   Specification of Letters Patent.   Patented Feb. 28, 1922.

Application filed October 26, 1920. Serial No. 419,586.

*To all whom it may concern:*

Be it known that I, EARL P. SIDLE, a citizen of the United States of America, residing at Kansas City, in the county of Jackson and State of Missouri, have invented new and useful Improvements in Kettle-Lid Holders, of which the following is a specification.

The object of the invention is to provide means whereby the kettle lid, such as is ordinarily employed in connection with kettles used for boiling vegetables, may be securely held in place during the tipping or tilting movement of the kettle for the purpose of draining therefrom and from the vegetables, the water in which the same have been boiled, said lid being maintained in proper position to prevent the escape of the vegetables without interfering with the outflow of water and without involving the risk of scalding or burning the operator by escape of either water or steam as when the lid must be held in place manually and must be moved back or from the lip or pouring edge of the kettle to permit of the escape of water while straining the vegetables.

It is a wellknown fact that in pouring water from the ordinary kettle for the purpose above indicated, after the completion of the boiling operation, it is a common practice for the cook to tilt the kettle by means of a handle or grip usually provided for that purpose while with the other hand the kettle cover or lid is held in place sufficiently loose to permit of the escape of water while straining the vegetables or drawn slightly back from the pouring edge or spout of the kettle, to permit of a free outflow of the water, and under the circumstances the scalding of the hands and arms is of frequent occurrence, due to the accidental slipping of the lid or cover or to the escaping steam, and it is with a view of avoiding these disadvantages in connection with a very necessary operation that the device of this invention has been designed.

Further objects and advantages will appear hereinafter it being understood that changes in the form, and proportion may be resorted to within the scope of the claim without departing from the spirit of the invention.

In the drawings:—

Figure 1 is a general view of a kettle provided with a lid or cover holding means constructed in accordance with the invention.

Figure 2 is a top plan view.

Figure 3 is a transverse sectional view taken on line 3—3 of Figure 2.

It will be understood that the device of the invention may be used in connection with kettles of any preferred material such as iron, tin, granite ware, or the like and may also be applied to kettles of the cast metal type, and therefore the kettle proper which is shown in the drawing at 10 is merely typical of the receptacles in connection with which the lid holder 11 may be employed, said lid holder consisting of an inturned lip, preferably consisting of members 11ª and 11ᵇ extending from the diametrically opposite side portions of the kettle, adjacent to the points of attachment of the bail 12, to the front or pouring edge of the kettle. When the kettle as shown in the drawing is formed with a pouring spout 13 the members of the inturned rim terminate short of the sides of the spout so that a free outlet of water from the interior of the vessel is provided. Moreover, the rim, while thus serving to hold the lid or cover 14 in place during the tilting of the kettle to the position indicated in Figure 3, allows sufficient play or looseness between the cover or lid and the rim, due to the depth of the latter, to provide for the escape of the water from the interior of the vessel without requiring that the lid or cover shall be drawn back to provide a sufficient outlet.

When as in the construction illustrated the kettle is provided at its upper edge with a rim or bead 15, the sheet metal constituting the members of the inturned rim 11 may be engaged therewith by rolling the lower edge into said bead, but obviously this feature is susceptible of modification to suit the particular construction of the vessel in connection with which the device is to be employed. Essentially, the members of the holding or seat rim must be permanently attached to the upper edge of the vessel throughout the forward half thereof, said members being spaced apart at their front ends to provide an outlet for the liquid contents of the vessel, the depth of the rim being sufficient to permit of a slight upward displacement of the lid or cover while positively holding the same against movement parallel with the upper edge of the vessel so that regardless of the angle at which the receptacle is being tilted, the lid or cover will be held in place without effort on the part of the operator and without necessitating the use of a hand to maintain it in position, and will prevent such a rapid escape of steam as will involve the risk of scalding the operator.

Having described the invention I claim:—

A kettle of the character described comprising a lid holder consisting of an inturned lip, said lip including a pair of members extending from the diametrically opposite side portions of the kettle, a bail secured to the sides of said kettle, a pouring spout formed by said lip in the kettle at one side thereof, and a cover provided for said kettle and being held in place during the tilting of the kettle.

In testimony whereof I affix my signature.

EARL P. SIDLE.